Aug. 17, 1954
J. C. SHAFER
2,686,451
BRAIDED SILICA ELEMENTS AND PROCESS
OF PRODUCING THE SAME
Filed June 23, 1953
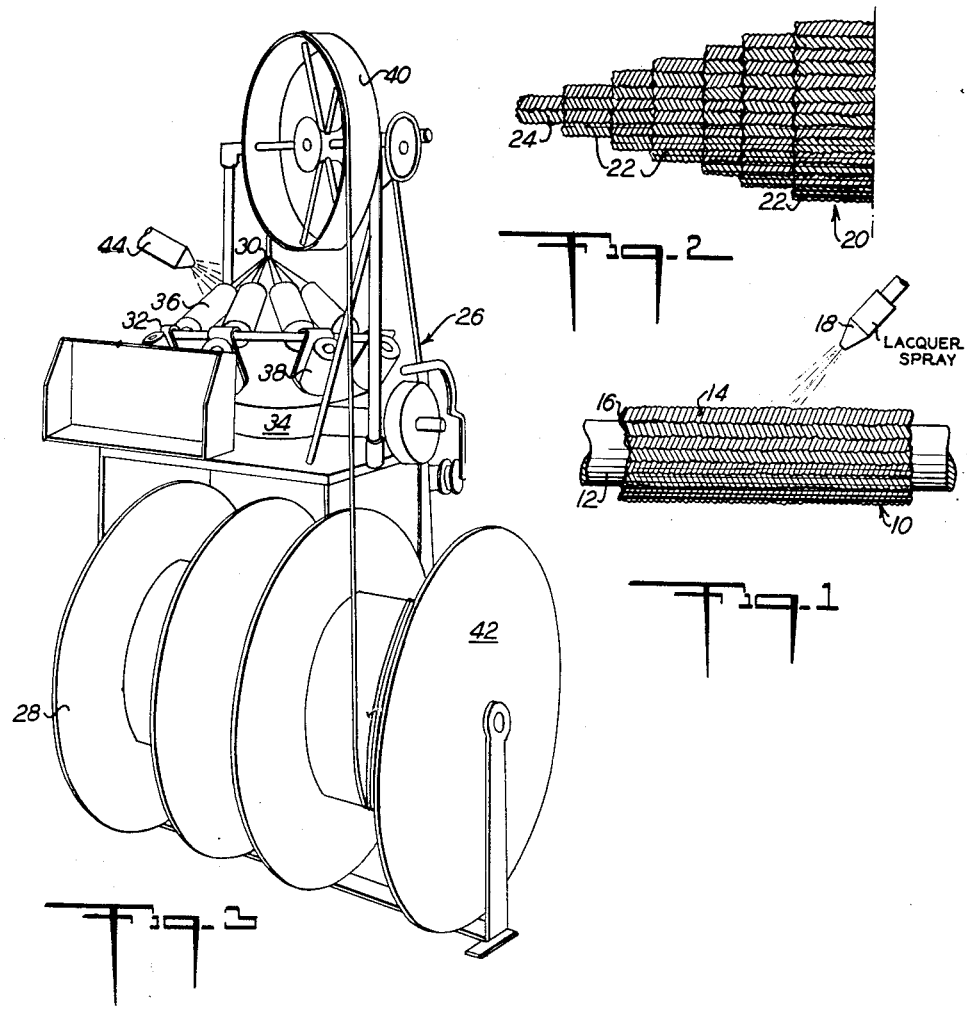
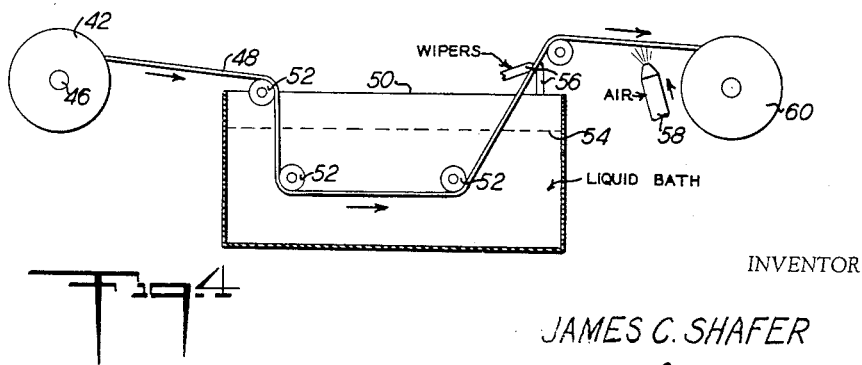
INVENTOR
JAMES C. SHAFER
BY
ATTORNEY Patented Aug. 17, 1954

2,686,451

UNITED STATES PATENT OFFICE 2,686,451

BRAIDED SILICA ELEMENTS AND PROCESS OF PRODUCING THE SAME

James C. Shafer, York, Pa., assignor to Continental Wire Corp., York, Pa., a corporation of Pennsylvania Application June 23, 1953, Serial No. 363,622

9 Claims. (Cl. 87—1)

This invention relates to elements formed by weaving or braiding threads of pure or substantially pure silica and a process of effecting such weaving or braiding.

Strands and threads of pure or substantially pure silica, $SiO_2$, are fragile, of low tensile strength, and sleazy, whereby spinning, knitting, weaving, or braiding the same is difficult to perform because the strands or threads are readily broken. Silica has a number of highly desirable properties, however, which render the same desirable, for example, for certain articles which are required to withstand high temperatures. Electrical insulation coverings and wicking are specific examples of such articles but the present invention is not restricted to these.

Glass fibers have been used for similar purposes but conventional glass fibers, which contain, in addition to silicon dioxide, various other simple or complex glass forming oxides do not have nearly as high resistance to elevated temperatures as substantially pure silica, although the tensile strength and resistance of glass fibers to abrasion are much higher than silica. For example, silica will withstand temperatures in excess of 2000° F. without appreciable change in dielectric properties, while certain types of commercial glass fibers now in common use will not withstand temperatures much in excess of 1200° F. without noticeable chemical and dielectric property changes.

Commercial glass fibers which contain various glass forming oxides in addition to silicon dioxide have the disadvantage that, when used as electrical insulation, for example, especially at temperatures in the vicinity of 2000° F., they produce a chemical effect, due to carbonization of certain organic fillers such as oxides, and liberation of certain organic substances, which changes the dielectric value of the fibers unfavorably. Thus, when an electrical conductor is covered with glass fibers for insulating purposes and is embodied in an instrument such as a pyrometer and is subjected to elevated temperatures approaching the melting point of the glass fibers or threads, the values indicated by the pyrometer are unreliable because of such change in dielectric properties of the fibers. There is also some evidence that the aforementioned chemical effect somewhat affects the metallic conductor and changes its current conducting properties, thereby correspondingly affecting the accuracy of an instrument in which the conductor is embodied.

Further, when conventional glass fibers are braided or woven to form wicking, it is essential that the interstices between the fibers be maintained even at high temperatures in order to provide the capillary action necessary to feed fuel to the burning end of a wick. Obviously, if the fibers or threads of the wick fuse, or chemical action clogs the pores the interstices will be reduced in size or number or completely eliminated, whereby the efficiency of the wick will be impaired or the wick will be rendered entirely useless.

The resistance to chemical change of pure or substantially pure silica at high temperatures has been known heretofore but strands and threads made from the same are so sleazy and fragile that attempts to weave or braid the same by conventional methods and on conventional machines have been unsuccessful in the past. In order to produce woven or braided pure silica articles, it has been found expedient to use relatively stronger glass fibers and threads, weave or braid the same, and then chemically leach the glass forming oxides other than silicon dioxide from the woven or braided article. Obviously this is a costly and time consuming procedure. Also, the finished product is weak in tensile strength, fragile and sleazy, especially when attempting to incorporate or fabricate the same into an instrument or device in which the product is to be used, for example, for electrical insulation in a pyrometer.

Inserting a metal conductor into a braided silica sheath formed by the above described method is a most tedious process due to the weak, fragile, and sleazy nature of the sheath. Likewise, endeavoring to form a plural layer structure such as a cylindrical wick by inserting within one cylindrical braided silica sheath a plurality of other sheaths of different diameters likewise defies ready performance for similar reasons, as well as the flimsy, limp and flexible nature of such sheaths.

The aforementioned difficulties could be overcome if it were possible for example, directly to weave or braid silica strands or threads onto a metallic conductor or, if it is desired to form a cylindrical wick, directly to weave or braid one or more layers of silica strands or threads directly onto an inner, similarly braided member. Heretofore, however, it has not been possible to do this due to the weak and fragile nature of such strands and threads.

The primary object of this invention is the provision of an improved pure silica braided or woven article of manufacture.

Another object of the present invention is to provide a process by which weaving or braiding silica strands or threads is possible so as directly to form, for example, such articles as a pure or substantially pure silica insulation sheath on a conductor or to form a built-up, multi-layered wick of such material by a direct braiding process.

It is a further object of the invention to perform such braiding or weaving on a suitable machine at a speed greatly reduced below conventional braiding or weaving speeds so as to minimize fracture of the strands or threads.

Still another object of the invention is to facilitate such braiding or weaving by using a limited quantity of preferably finely divided particles of lubricant on the strands or threads while being braided or woven, such lubricant having no deleterious effect on the fibers and preferably being removable readily, if desired, by raising the braided or woven product to a predetermined temperature, preferably well below the melting point of the product, whereby said lubricant is sublimated or evaporated from the product when in operative condition in an instrument, for example, such as a pyrometer.

One further object of the invention is to utilize a fixative such as a thin coating on the braided or woven silica product to facilitate handling and fabrication thereof into an instrument or otherwise with a minimum of possibility of fracture or rupture of the braided product while being so fabricated, said fixative, for example, in the preferred embodiment of the invention also being of the nature of a sprayed light coating of lacquer which may readily be removed by sublimation, for example, from the product following fabrication thereof, if desired, by elevating the same to a predetermined temperature, without injury to the braided or woven silica product.

A still further object of the invention is to provide a woven or braided pure, or substantially pure, silica product of indefinite length either on a base member such as an electrical conductor of corresponding length or upon a similarly woven or braided core member of silica.

Details of the foregoing objects and of the invention, as well as other objects thereof, are set forth in the following specification and illustrated in the accompanying drawings comprising a part thereof.

In the drawings:

Fig. 1 is a side elevation of an exemplary electrical conductor, illustrated on enlarged scale and fragmentarily, on which an insulation covering or sheath of silica has been braided in accordance with the present invention.

Fig. 2 is a side elevation of an exemplary wicklike element, illustrated on enlarged scale and fragmentarily, which has been formed by braiding a plurality of cylindrical layers of silica upon each other in accordance with the present invention.

Fig. 3 is a side elevation of a braiding machine capable of braiding silica in accordance with the present invention to form the articles exemplarily illustrated in Figs. 1 and 2.

Fig. 4 is a diagrammatic side elevation of an exemplary fixative coating applying mechanism used in the process comprising part of the present invention.

Referring to the drawings, Fig. 1 illustrates a braided element comprising an exemplary insulated electrical conductor 10 formed in accordance with the present invention. Said conductor comprises a preferably flexible metallic core 12 such as wire or flexible cable. Braided unto said core 12, preferably relatively tautly, is an insulating tube or sheath 14 composed of individual substantially pure silica threads 16. In the preferred embodiment of the invention, the threads 16 are relatively taut, whereby the sheath 14 snugly or closely engages the core 12.

The individual threads 16 of substantially pure silica are quite weak in tensile strength, especially as compared with average commercial glass fibers which contain other glass forming oxides in addition to silica. Commercial glass fiber threads have a tensile strength substantially ten times as great as that of pure silica threads of comparable size and weight. In view of this disparagement in tensile stregth, the sheath 14 is normally relatively weak in abrasive strength, as well as tensile strength as compared to commercial glass fibers containing other oxides. Accordingly, an insulated conductor 10 of the type shown in Fig. 1 can not be formed by conventional methods of braiding. Further, the conductor 10, when formed in accordance with the methods of the present invention, is somewhat fragile to handle, especially during fabrication of a length of said conductor into a mechanism or instrument in which said conductor is to be used. To render the conductor 10 more capable of fabrication as described above without the possibility of rupturing the sheath 14, it is preferred in accordance with the invention that the sheath 14, after being braided unto the conductor 12, have a preferably light coating of a suitable fixative applied to the exterior of the sheath. Fig. 1 illustrates a somewhat diagrammatic means to apply such coating by an exemplary spray nozzle 18. Other means to apply such coating may be used, as described in detail hereinafter.

A number of different fixative substances may be used for the intended purpose. One example of such comprises cellulose acetate butyrate lacquer. This specific lacquer is admirably suited for the intended purpose because it not only dries rapidly after being applied to the conductor 10, but the same can be sublimated at a temperature approximately between 250° and 300° F. Thus, after said conductor has been fabricated in an instrument, for example, said instrument may be subjected to a temperature within the above specified range and the coating will then be sublimated so as to be completely removed from the conductor and in no way interfere with the di-electric properties of the sheath 14 or the conductivity of the conductor covered thereby.

One principal advantage of using substantially pure silica threads to form the sheath 14 is that said sheath can be subjected to temperatures up to at least 2000° F. without in any way deteriorating the di-electric properties of the sheath, nor will the sheath in any way interfere with the conducting properties of the core 12, even at such high temperatures, assuming said conductor will withstand such temperatures. It is obvious that the foregoing will have beneficial effect especially when the conductor 10 is used in instruments by which accurate measurements are made such as, for example, pyrometers.

Conductors on which threads containing oxides other than silica are braided can be used to withstand temperatures of the order of approximately 1200° F. but it is found that if these are subjected to higher temperatures, the increased temperature causes the oxides chemically to react with each other and with the metallic core 12.

This results in the di-electric properties of the sheath being changed and impaired, as well as the conducting properties of the core.

The present invention is also applicable to the formation of multi-layered cylindrical products, such as the exemplary wicking 20 illustrated in Fig. 2. Said wicking is preferably formed by braiding successive tubular layers 22 unto, for example, a braided core 24. The core 24, as well as the successive layers 22, are formed from preferably tautly braided substantially pure silica threads similar to those employed to form the sheath 14 shown in Fig. 1. The layers 22 preferably tightly engage each other as well as the core 24, yet the interstices between the layers and core and between the individual threads thereof will permit fluid to pass along the wicking by capillary action.

The wicking 20, being formed from substantially pure silica threads, is capable of sustaining temperatures up to approximately 2000° F. without physical deterioration, or deformation of the threads or impairment of the capillary action of the wicking. In situations where the fuel used with the wicking will permit, the wicking 20 may be coated similarly to the conductor 10 shown in Fig. 1 for purposes of rendering the wicking less fragile. However, in situations where the liquid to be conducted by the wicking is a solvent for the coating, for example, said coating may be omitted or a different coating selected which is not soluable in the fuel.

The exemplary conductor 10 and wicking 20 may be formed by braiding on a machine 26 illustrated in Fig. 3. The braiding machine shown therein has a reel 28 on which either the metallic core 12 or the braided silica core 24 is wound and passes up through the head guide 30. The machine also includes an upper head 32 and a lower head 34 on which bobbins 36 and 38 of silica are mounted. The heads 32 and 34 are rotated in opposite directions in accordance with conventional braiding practice so as to form either the sheath 14 on a metallic core 12 or the successively braided layers 22 and the braided core 24 of the wicking 20. The braided product is wound around the capstan 40 a number of times and then passes downward and is wound upon the reel 42. The capstan 40 has a steadying and equalizing effect upon the product.

In view of the low tensile strength and flexible nature of the substantially pure silica threads on the bobbins 36 and 38, the braiding machine 26 must be operated at a substantially lower speed than that used when braiding conventional glass fibers. Whereas, for example, the heads 32 and 34 are operated at approximately 160 R. P. M. when braiding conventional glass fibers which are substantially stronger than pure silica fibers, it has been found that these heads may not safely be operated at speeds substantially exceeding 40 R. P. M. when braiding threads formed from substantially pure silica fibers.

The threads on the bobbins 36 and 38 pass through a number of guide means while being braided. Passing said threads through such guide means subjects the same to possible fracture, even when the machine 26 is operated at the relatively slow speeds referred to above. To minimize such possible fracture of the threads, under these circumstances, it has been found preferable that said threads be lubricated, while being braided, with a limited quantity of preferably organic lubricant divided into minute particles and carried by a stream or spray of preferably highly volatile carrying agent, applied in the form of a mist. An exemplary spray head 44 is shown in Fig. 3 and the preferred active ingredient of said spray is a petroleum distillate. Certain commercial suitable types of lubricant are available which comprise a highly volatile carrying agent and solvent for said petroleum distillate, said distillate comprising between 1% and 2% by weight of the lubricant mass. This type of lubricant and particularly the active ingredient thereof has been found to produce no substantial weakening of the fibers and facilitates the passage of the silica threads through the guide means as well as the actual braiding thereof onto the core upon which said threads are braided.

The braided product, as it is passes from the capstan 40 and before coiled unto the reel 42, may be coated with a suitable fixative such as by a nozzle 18 as shown in Fig. 1 and described hereinabove. However, in the preferred embodiment of the invention, the braided product is coiled upon reel 42, and said reel of product is then removed from the braiding machine 26 and transferred to a suitable spindle 46 of a coating apparatus illustrated in Fig. 4 in an exemplary and diagrammatic manner. The braided element or product 48 is fed from the reel 42 into a coating tank 50, suitable guide pulleys 52 being provided so as to insure immersion of the product 48 into the liquid bath 54. As the coated product passes from the bath 54, wipers 56 are arranged to remove any excess coating from the product 48. If desired, drying of the coating on the product 48 may be insured by a suitable air blast 58. The coated product is then coiled upon reel 60 upon which the product may be shipped if desired. It will be understood of course that the coating applied to the product by the apparatus shown in Fig. 4 is similar to that described in the foregoing relative to the conductor 10 and applied by nozzle 18.

The lubricant and particularly the carrying agent therefor which is applied by nozzle 44 to the threads while being braided is preferably of relatively high volatility so that it will be completely evaporated from the product either by being air dried or by subjecting the same to a suitable temperature such, for example, as the temperature at which the coating will be sublimated. Thus, when the product is fabricated into an instrument or mechanism and the latter is subjected to the above described temperature, both the fixative coating and the lubricant will simultaneously be removed from the braided product.

It will be seen from the foregoing that the present invention provides a braided substantially pure silica element or product such, for example, as an insulated electrical conductor, multi-layered cylindrical wicking and the like, as well as a method of forming the same. Such products may be formed in continuous lengths and although the threads of substantially pure silica normally are far more fragile and have substantially less tensile strength and resistance to abrasion than conventional glass fibers which contain oxides other than silicon dioxide, braided products formed from the same way may be handled without serious possibilities of fracture while being incorporated in instruments and mechanisms, or otherwise. Although in the preferred embodiment of the invention, a fixative coating is applied to the braided silica product, such coating may readily be removed by sublimation without impairing any of the desired properties of the product. Formation of indefinite lengths of products of the natures described hereinabove has not previously been possible by means commonly used in forming braided glass fiber products and the present invention thus makes possible the formation of such products in a relatively inexpensive manner. Thus, the highly desirable insulating properties of substantially pure silica and particularly the ability of said product to withstand temperatures up to substantially 2000° F. without physical or chemical changes are now readily made available.

While the invention has been shown in its preferred embodiment, and has included certain details, it should be understood that the invention is not to be limited to the precise details herein illustrated and described since the same may be carried out in other ways falling within the scope of the invention as claimed.

I claim:

1. The process of forming an insulated conductor in a continuous length which comprises braiding substantially pure silica threads of low tensile and abrasive strength directly onto a conducting core of continuous length, and lubricating the threads prior to braiding with an organic lubricant divided into minute particles and carried by a stream of highly volatile carrying agent.

2. The process of forming a continuous length of a textile element from substantially pure silica fibrous threads of very low tensile and abrasive strengths which comprises lubricating said thread with an organic lubricant divided into minute particles and carried by a stream of volatile carrying agent, the velocity of said stream and the size of said lubricant particles being so correlated that the weak fibers are not injured by the lubrication, and braiding a plurality of such threads into a textile element.

3. The process of forming a continuous length of a textile element from substantially pure silica threads of very low tensile and abrasive strengths which comprises lubricating said threads with an organic lubricant divided into minute particles and carried by a stream of volatile carrying agent, the velocity of said stream and the size of said lubricant particles being so correlated that the weak fibers are not injured by the lubrication, and braiding a plurality of such threads into a textile element, the braiding speed being regulated to prevent rupture of the threads.

4. A new article of manufacture comprising a continuous length of circular braid formed from a plurality of substantially pure silica threads characterized by low tensile strength, low abrasive strength and high heat resistance, and a resinous protective coating on said braid which is capable of being sublimated in the presence of high temperatures in the nature of from about 250° to 300° F., said braid being characterized by the relatively taut condition of the individual threads therein.

5. A flexible insulated conductor comprising a continuous length of conducting wire, and a flexible insulated cover braided directly thereonto and capable of withstanding temperatures up to about 2000° F., said cover being formed from individual threads of substantially pure silica.

6. A flexible insulated conductor comprising a continuous length of conducting wire and a braided insulating cover capable of withstanding temperatures up to about 2000° F., said cover being formed from individual threads of substantially pure silica of low tensile and abrasive strength, the thread elements being taut around said conductor by virtue of having been braided directly onto said conductor.

7. The method of forming delicate parts for scientific measuring apparatus from pure silica threads which comprises gently lubricating said threads prior to braiding with a volatile lubricant, braiding said lubricated fibers into an article, and forthwith coating the newly braided article with a heat removable protective lacquer.

8. The process as set forth in claim 2 wherein the textile element is a braided wicking capable of withstanding temperatures up to about 2000° F. and which also comprises first braiding a core, then braiding successive layers of sheaths on the core and regulating the braiding speed so as to prevent rupture of the threads.

9. An article as set forth in claim 4 wherein the braid is a wicking capable of withstanding temperatures up to about 2000° F. and said wicking includes a braided core and successive layers of sheaths braided on said core.

References Cited in the file of this patent

UNITED STATES PATENTS

| Number | Name | Date |
| --- | --- | --- |
| 2,667,684 | Boyer | Feb. 2, 1954 |
| 2,667,804 | Boyer | Feb. 2, 1954 |